United States Patent [19]
Bowser

[11] 3,823,692
[45] July 16, 1974

[54] LIVESTOCK WATERING FOUNTAIN

[76] Inventor: Harold O. Bowser, Box 22, Renfrew, Pa. 16053

[22] Filed: Mar. 26, 1973

[21] Appl. No.: 344,489

[52] U.S. Cl. ................................................ 119/78
[51] Int. Cl. ............................................. A01k 7/00
[58] Field of Search .................... 119/72, 73, 78–81

[56] References Cited
UNITED STATES PATENTS

| | | | |
|---|---|---|---|
| 1,839,595 | 1/1932 | Ritchie | 119/73 |
| 2,532,999 | 12/1950 | Donahoe et al. | 119/73 |
| 2,662,503 | 12/1953 | Johnson | 119/80 |
| 3,581,710 | 6/1971 | Van Gilst | 119/78 |

Primary Examiner—Robert Peshock
Assistant Examiner—J. N. Eskovitz
Attorney, Agent, or Firm—Carothers and Carothers

[57] ABSTRACT

A livestock watering fountain wherein a watering bowl or basin is provided with an adjustable water level control valve which, in turn, is connected to a controllable water source. A drain is provided in the bottom of the bowl for periodic cleaning. The watering bowl is characterized by a removable horizontal false bottom. The watering fountain is particularly adaptable to use with race horses. The false bottom prevents an overheated horse from swallowing more than a predetermined amount of water. The horse can drink no lower in the bowl than the level of the false bottom when the main water supply is turned off, thereby preventing the horse from foundering.

4 Claims, 3 Drawing Figures

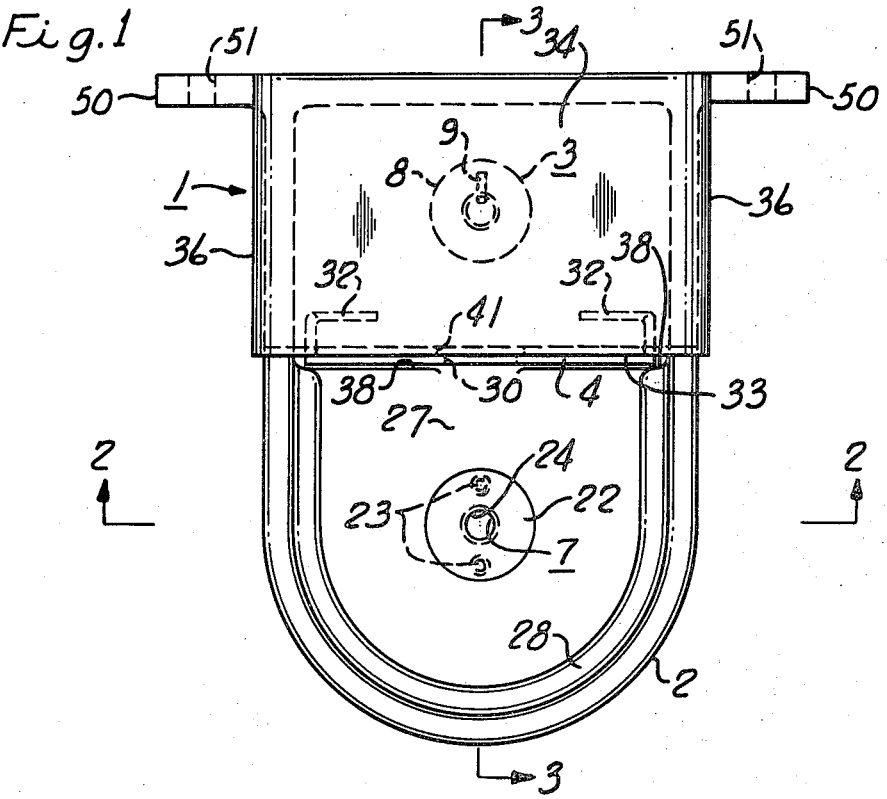
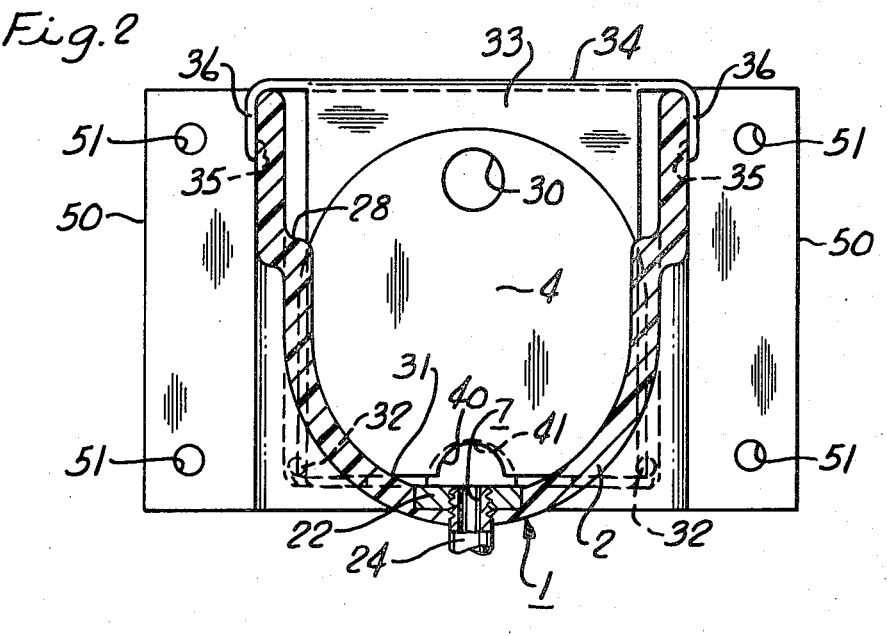

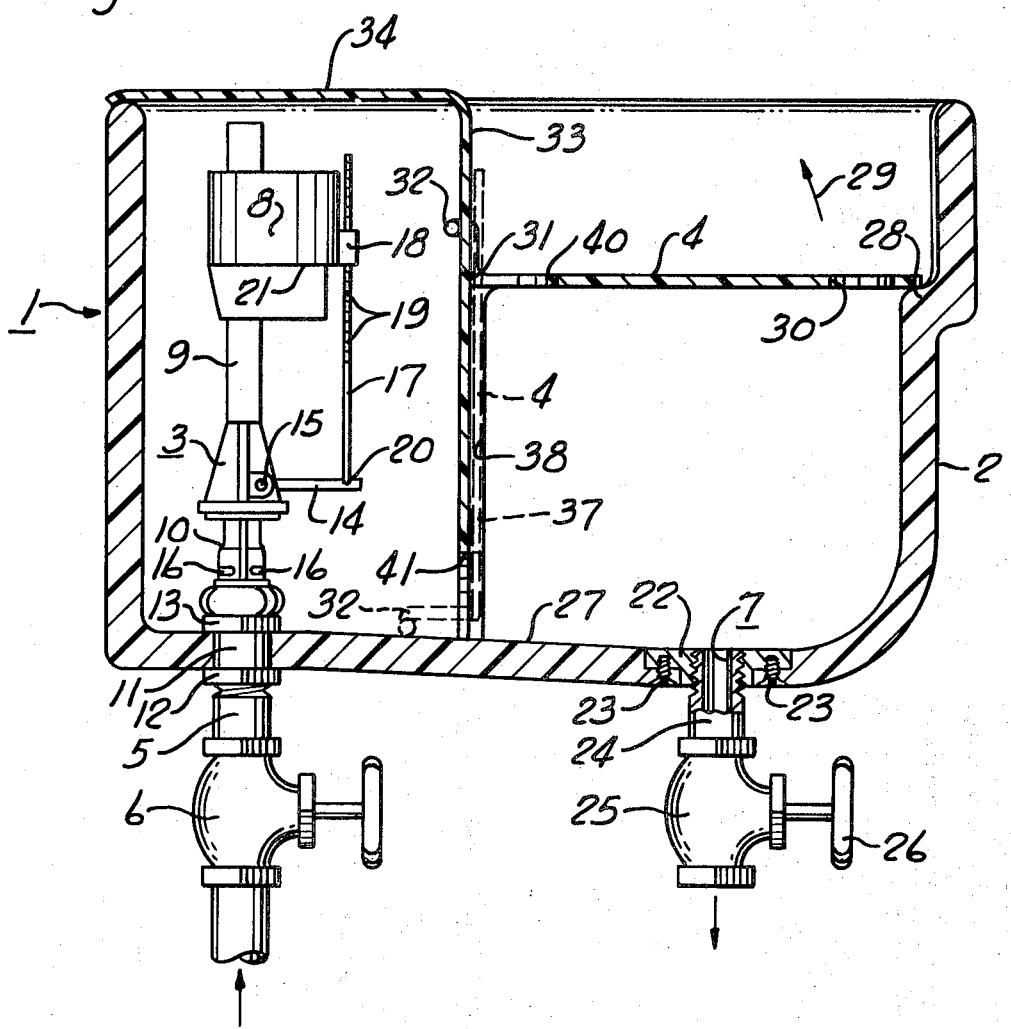

LIVESTOCK WATERING FOUNTAIN

BACKGROUND OF THE INVENTION

This invention relates generally to livestock watering systems and more particularly to automatic watering systems for delivering prescribed amounts of water to livestock.

When a horse is worked extremely hard and thus becomes overheated, such as a race horse upon the completion of a race or a workout, it must be watered very slowly at prescribed intervals in order to prevent the horse from foundering. Once a race horse founders from consuming excessive water while being overheated, the race horse becomes useless, and accordingly, it is obvious that very careful control of the animal's water consumption must be maintained. This is particularly true in view of the very expensive nature of race horses.

Generally, after the horse has been worked, it will be allowed only approximately six swallows of water on the average (depending upon the particular horse and the degree of overheating) approximately every 10 to 15 minutes. For the average horse, six swallows amounts to approximately one pint to a quart of water.

The horse is thus permitted only six swallows every 10 to 15 minutes until such time that the animal is sufficiently cooled to a point where the groom or trainer determines that the horse may be permitted to drink to full satisfaction.

Many stables are provided with automatic watering fountains for race horses which are operated in many different ways such as by float control water level valves or valves which are actuated by the animal itself as by tilting the watering trough or bowl.

When the horse has been raced, these continuous sources of water, of course, must be made unavailable to the horse in order to prevent the animal from foundering. The horse is then permitted its first six swallows or so of water, and this is generally measured out in the bottom of a pail and the horse is watered directly from the pail.

Accordingly, the prescribed amount of water must be carried to the horse every 10 to 15 minutes until it is determined that the horse has sufficiently cooled. While it is important not to overwater the horse in an overheated state, it is also very important that the horse obtains the maximum amount of water possible while still assuring that foundering will not occur. Once the horse has sufficiently cooled, then it is permitted to have access once again to the automatic watering trough.

Thus, under the present system, when the overheated horse is brought back into the stable, the automatic watering system must either be covered up, drained, or the horse must be withdrawn from access to the system and the measured amounts of water must be hand carried which, of course, requires undesirable labor and expense, as well as inconvenience.

It is the principal object of the present invention to provide an automatic watering system which may also be utilized to deliver the prescribed quantities of water to the overheated animal by the same automatic watering system from which the animal normally drinks its full requirements, thereby eliminating hand carrying of the prescribed quantities.

SUMMARY OF THE INVENTION

The automatic livestock watering fountain of the present invention comprises a watering bowl or basin containing an adjustable water level control valve which in turn is connected to a controllable water source. A removable horizontal false bottom is provided in the bowl such that when the false bottom is in position and the main water source is turned off, the horse can only drink the prescribed amount of water in the bowl which is above the level of the false bottom. This amount may be preselected by adjusting the water level control valve accordingly. A drain with a drain plug is provided in the bottom of the bowl to permit easy cleaning thereof.

In its preferable form, the false bottom is provided with hinges such that it is removed by lifting the false bottom and hinging it aside to permit access to the true bottom of the bowl.

The false bottom generally rests on a horizontal ledge in the bowl, and the hinge, in addition, is preferably vertically slidable within the bowl on a vertical track, and retaining means is provided in the bowl to receive and vertically retain the false bottom when it is hinged to the vertical position and slid downwardly on the track into the retaining means.

A removable cover is preferably provided over the water level control valve in order to prevent the animal from tampering with it. The cover is made removable so that adjustments may be made to the control valve to adjust for the desired water level. The cover must be constructed so that it can not obstruct the flow of water throughout the entire bowl bottom.

BRIEF DESCRIPTION OF THE DRAWINGS

Other objects and advantages appear in the following description and claims.

The accompanying drawings show, for the purpose of examplification without limiting the invention or the claims thereto, certain practical embodiments illustrating the principles of this invention wherein:

FIG. 1 is a top view of one embodiment of the watering fountain of the present invention illustrating the false bottom in its up or open position.

FIG. 2 is a front view in partial section of the livestock watering fountain illustrated in FIG. 1, the section being taken along line 2—2 of FIG. 1.

FIG. 3 is a sectional view in side elevation of the livestock watering fountain illustrated in FIG. 1 with the false bottom shown in its closed or horizontal position, the section being taken along line 3—3 of FIG. 1.

DETAILED DESCRIPTON OF THE DRAWINGS

Referring to the drawings, the livestock watering fountain 1 consists of a water basin or bowl 2, a water level control valve 3, a false bottom 4, a water inlet 5 controlled by valve 6 and feeding the water level control valve 3, and drain 7.

The water basin 2 is constructed of any suitable material, and in this instance is constructed of molded plastic. However, other materials may be used such as cast or extruded metals.

Any conventional liquid level control valve may be employed for the liquid level control valve 3. The liquid level control valve 3 illustrated in the drawings may be readily found in the present market and is illustrated and described in detail in U.S. Pat. Nos. 3,428,966;

3,495,803; and 3,559,675. The operation description of the liquid level control valve as set forth in these patents is incorporated herein by reference.

For the purposes of describing the present invention, it is sufficient merely to note that the liquid level control valve 3 is provided with a float which is vertically slidable on the upwardly protruding slide member 9, which is in turn rigidly connected to the valve housing 10. The liquid level control valve 3 is rigidly connected at its base to the bottom of the water basin 2 by means of the threaded sleeve member 11, which threadably receives the downwardly protruding end inlet pipe of the water level control valve 3, thereby clamping the bottom of the basin 2 between the hexagonal head 12 of the threaded sleeve member 11 and the hexagonal head 13, which is rigidly secured to the base of the valve housing 10.

The inlet pipe 5 is then also threadably received in the bottom of the internally threaded sleeve member 11. Inlet pipe 5 is, in turn, connected to a water source under pressure, which is controlled by means of valve 6.

The liquid level control valve 3 is operated by lever 14 which pivots about point 15. When arm or lever 14 is lowered about pivot 15, the valve housed within housing 10 opens and permits water to flow into the basin 2 through the openings 16.

As previously mentioned, float 8 is permitted to slide vertically on slide member 9, and it is adjustably but rigidly secured to vertical rod 17 by means of a hand operable pinch clamp 18, which when squeezed permits the clamp, together with the float 8 which is rigidly secured thereto, to slide upwardly or downwardly on the rod 17 to the desired position, whereupon the pinch clamp 18 is released. The scores or indents 19 provided on the outer surface of the rod 17 assist in preventing the pinch clamp 18 from further sliding up or down on the rod 17 after the pinch clamp has been released.

The bottom end of vertical rod 17 is pivotally secured in turn to the lever or arm 14 as indicated at 20. Thus, when the lever or arm 14 is weighted in its full down position as indicated in the figure due to its own weight and the weight of the float 8 and connecting rod 17, water is permitted to flow through an inlet pipe 5 from the water source through valve 6 out into the basin 2 through opening 16 until the water level reaches the bottom 21 of the float 8 and raises the float and lever 14 in turn a sufficient amount to close the valve in housing 10. It is thus obvious that the water level maintained within the basin 2 may be easily varied by changing the position of pinch clamp 18 on vertical connecting rod 17.

Drain 7 is provided by a metal internally-threaded ring or collar member 22 which is secured to the bottom of basin 2 by means of machine screws 23, and which in turn threadably receives drain pipe 24. Drain pipe 24 is provided with a drain valve 25 operated by handle 26. Of course, any other suitable drain means other than a valve, such as a plug, may be employed in substitution of the valve 25.

It will be noted that the floor 27 of the water basin 2 is sloped downwardly from the water level control valve inlet to the drain 7 in order that any sediment or other particulate matter which may collect in the basin will converge toward the drain 7. Drain 7 permits easy cleaning of the basin 2, which is very important, especially in connection with horses, as many animals such as horses will not drink from unclean basins.

The forward portion of the inside of basin 2 is provided with a semi-annular ledge 28 upon which the false bottom 4 rests when it is in its horizontal closed position as illustrated in FIGS. 1 and 3.

False bottom 4 may be hinged upwardly as indicated by arrow 29 by placing one's finger through the opening or hole 30 in the false bottom and thereby grasping the same and pivoting it about the hinged end 31. The false bottom 4 is molded of plastic in this instance, and the hinge at its hinged end 31 is provided by means of two heavy bent wires molded into the hinged end 31 of the false bottom or by two plastic extensions or hinged members 32 which are integrally molded with the false bottom 4. These hinged members 32 are provided on opposite sides of the hinged end 31 of false bottom 4, and they extend therefrom around the side edges of the vertical panel portion 33 of the plastic molded cover 34 which covers the liquid level control valve 3. Cover 34 is also molded of plastic and is temporarily secured to the water basin 2 by means of the snap fit as indicated at 35. The downwardly protruding side ears 36 of the cover 34 are provided with snap ribs at their bottoms which are received in corresponding grooves in the outside of basin 2. The ears 36 may be spread sufficiently to permit the ears 36 with their bottom rib protrusions to slide downwardly over the side of the water basin until the protruding snap ribs engage their corresponding snap grooves as indicated at 35.

The hinged members 32 merely embrace the side edges of the front panel 33 of cover 34 such that when the false bottom 4 is lifted or hinged about its hinged end 31 to a full vertical position, the entire false bottom 4 together with its hinged members 32 may be slid vertically and downwardly such that the side edges of front panel 33 act as a track for guiding the vertically slidable hinged members 32 and the false bottom 4 may be lowered to its full open position as indicated by the dashed outline 37.

False bottom 4 is retained in its open vertical position by means of the front panel 33 on one side and by the vertical side ledges 38 on the other side.

In order to close the false bottom 4 from its open vertical position as indicated at 37, one merely places his finger in the opening 30 provided at the top of the false bottom 4 and thereby lifts the false bottom 4 vertically upward until the hinged members 32 clear the upper semi-annular ledge 30 so that the sides of the false bottom 4 are no longer engaged by the side ledges 38 and the false bottom 4 may be pivoted downwardly about its hinged end 31 to its horizontal closed position as indicated in FIG. 3.

The hinged end 31 of false bottom 4 is further provided with a bottom opening or passage 40. The vertical front face 33 of the cover 34 is also provided with an opening or passage 41 at its bottom end to permit the free passage of water from the liquid level control valve 3 to the drain side of the basin. The opening 40 in the hinged end 31 of false bottom 40 provides the same function when the false bottom 4 is in its open resting position as indicated by the dashed outline 37. Opening or passage 40 coincides with opening 41 to permit the free flow of liquid from the water supply side of basin 2 to the drain side.

When the horse to be watered has not been worked or overheated, it is desirable that it be permitted to drink water to its full satisfaction. Accordingly, drain 7 is maintained in its closed state and false bottom 4 is placed in its open position as indicated by the dashed outline 37 so that the horse may drink water retained within the basin 2 below the level of the false bottom 4 when it is in its closed horizontal position as indicated in FIG. 3. As the horse drinks water, the float 8 will lower with the water level, thereby opening the water level control valve to permit water to flow from the source through inlet opening 16 to replenish the water supply to its original level as set or predetermined by the adjustment of float 18 on the vertical connecting and adjusting rod 17.

When the horse has been worked and is overheated, the groom merely closes the false bottom 4 by placing it in the closed position as indicated in FIG. 3 and in addition turns off the water inlet valve 6 to cut off the flow of new water into the basin 2.

The float 8 is preadjusted on rod 17 in order to set the water level above the false bottom 4 when it is in its horizontal closed position a desired amount. The water level would be adjusted such that approximately one pint to a quart of water only is confined within the basin 2 in the area defined by the false bottom 4, the vertical panel 33 of cover 34 and the upper inside face of the basin 2 which lies above the horizontal ledge 28.

Thus, when the horse is led to his stall, he will immediately drink his first six swallows or so of water as permitted. Then 10 or 15 minutes later, the groom will open valve 6 and permit the basin to refill to the predetermined water level above the false bottom 4 whereupon the liquid level control valve 3 will again close, and the groom will then reclose valve 6 to cut off the source again. The horse is then permitted six more swallows or so of water.

This procedure is repeated until it is determined that the horse is sufficiently cooled to permit it to have its full quantity or want of water. At this point, the groom then merely raises the false bottom 4 and places it in its vertical open position as indicated at 37 and opens valve 6. The horse is then automatically watered for as long as desired.

In order to mount the watering fountain to a wall, the basin 2 is provided with integrally molded side flanges 50 which have mounting holes 51 to permit mounting of the watering fountain by means of screws, bolts, or the like to a wall structure.

When access to the liquid level control valve 3 is desired or when it is desired to clean the basin, the cover 34 and the false bottom 4 may be readily removed entirely from the interior of the water basin 2.

It is also obvious that the false bottom 4 need not necessarily be hinged to the front panel 33 of the cover 34. In this manner, the false bottom 4 may be opened by merely removing it entirely from the basin 2. However, this has the disadvantage that the false bottom 4 may then be easily lost or misplaced, and thus the embodiment illustrated is preferred.

By the foregoing description, it can be readily seen that the hand carrying of premeasured quantities of water every 10 to 15 minutes to the animal is completely eliminated, and the groom need only open and close valve 6 as required.

Valve 6 may also be electromechanically operated, and provided with a timer whereby the basin will be permitted to fill with water to the predetermined level every 10 or 15 minutes as set on the timer.

However, it is preferable to have the valve manually operated in order to assure that the horse does not obtain too much water when it is overheated due to a malfunction in the valve.

I claim:

1. A livestock watering fountain comprising a watering bowl, an adjustable water level control valve in said bowl, a removable cover over said valve with water passage means to permit the free flow of water thereby in said bowl, a water source connected to said control valve, a source valve controlling the water flow from said water source, a drain with drain plug means in the bottom of said bowl, and a removable horizontal false bottom resting on a horizontal ledge in said bowl and hinged independently of said cover at one end relative to said bowl to permit the removal thereof by hinging it aside in said bowl.

2. The livestock watering fountain of claim 1 wherein said false bottom is hinged with an opposed pair of hinge extensions extending from one end of said false bottom and embracing edges of said cover within said bowl.

3. A livestock watering fountain comprising a watering bowl, an adjustable water level control valve in said bowl, a water source connected to said control valve, a source valve controlling the water flow from said water source, a drain plug means in the bottom of said bowl, a horizontal false bottom resting on a horizontal ledge in said bowl and hinged at one end relative to said bowl to permit the removal thereof by hinging it aside, said hinge being vertically slidable within said bowl on a track and retaining means to receive and vertically retain said false bottom when hinged to vertical and slid downwardly therein on said track.

4. The livestock watering fountain of claim 3 including a removable cover covering said water level control valve without obstructing the flow of water from the control valve to all portions of the bowl bottom.

* * * * *